Oct. 31, 1961  E. J. DIEBOLD  3,007,088
RECTIFIER AND MEANS FOR MOUNTING THE SAME
Filed Sept. 26, 1957  3 Sheets-Sheet 1

INVENTOR.
EDWARD J. DIEBOLD
BY D. Gordon Angus
ATTORNEY.

Oct. 31, 1961 E. J. DIEBOLD 3,007,088
RECTIFIER AND MEANS FOR MOUNTING THE SAME
Filed Sept. 26, 1957 3 Sheets-Sheet 2

INVENTOR.
EDWARD J. DIEBOLD
BY D. Gordon Angus
ATTORNEY.

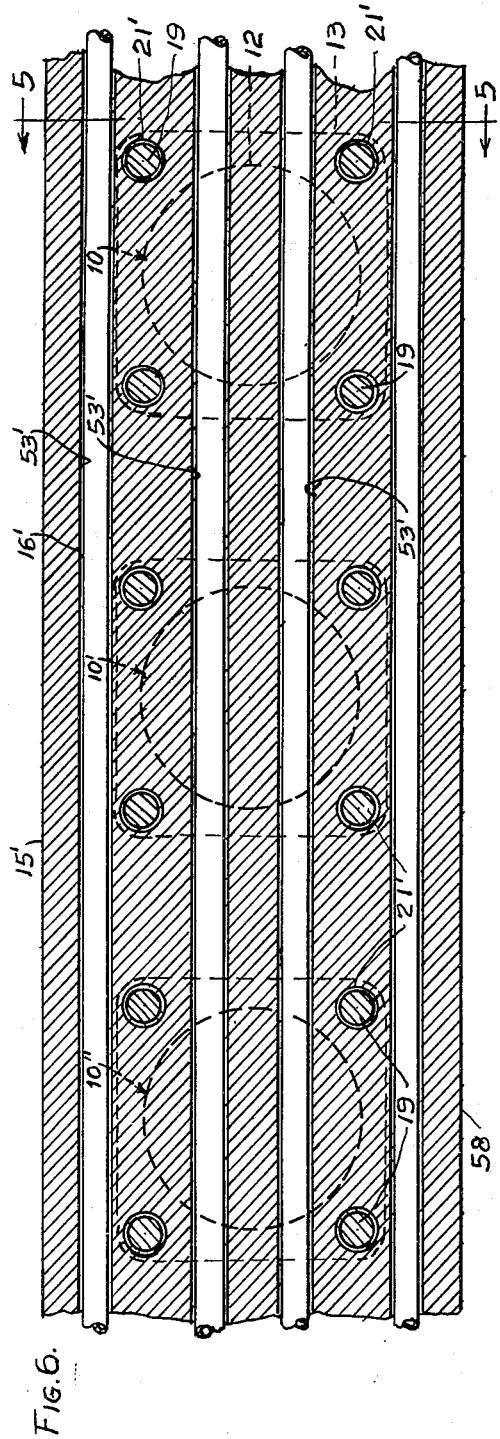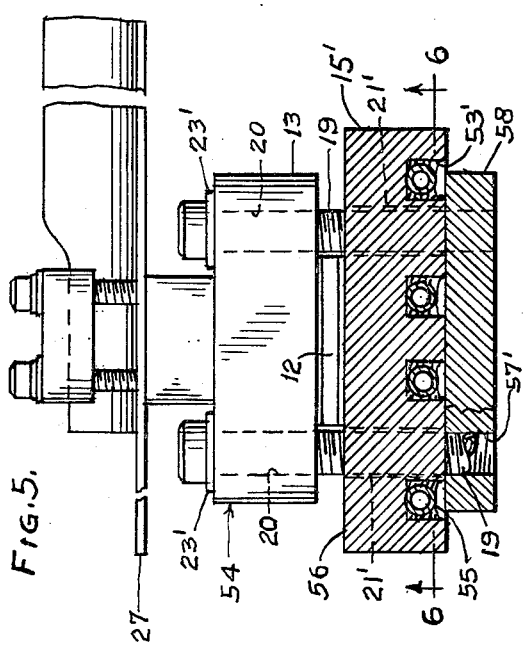

United States Patent Office 3,007,088
Patented Oct. 31, 1961

3,007,088
RECTIFIER AND MEANS FOR MOUNTING
THE SAME
Edward J. Diebold, Palos Verdes Estates, Calif., assignor to International Rectifier Corporation, El Segundo, Calif., a corporation of California
Filed Sept. 26, 1957, Ser. No. 686,331
12 Claims. (Cl. 317—234)

This invention relates to current rectifiers and to means for mounting and cooling the same.

An object of this invention is to provide a rectifier able to carry large currents, with means for dissipating the heat generated in its operation.

A related object is to provide means whereby fluid coolant can be utilized for cooling without having the coolant in the portion of the housing structure which contains the rectifier itself. By this means, the rectifier can be easily removed and replaced independently of the coolant system, and without spilling any of the coolant.

According to this invention, a rectifier, such as a crystal-junction rectifier utilizing a germanium or silicon wafer as a rectifying medium, is clamped to a fluid-cooled bus bar.

The above and other features of the invention will be fully understood from the following description and accompanying drawings of which:

FIG. 5 is a side elevation, partly in cross section, of a rectifier and a mounting similar to that of FIG. 1 but provided with a modified form of cooling structure; and FIG. 6 is a fragmentary cross-section taken at line 6—6 in FIG. 5.

Figure 1:
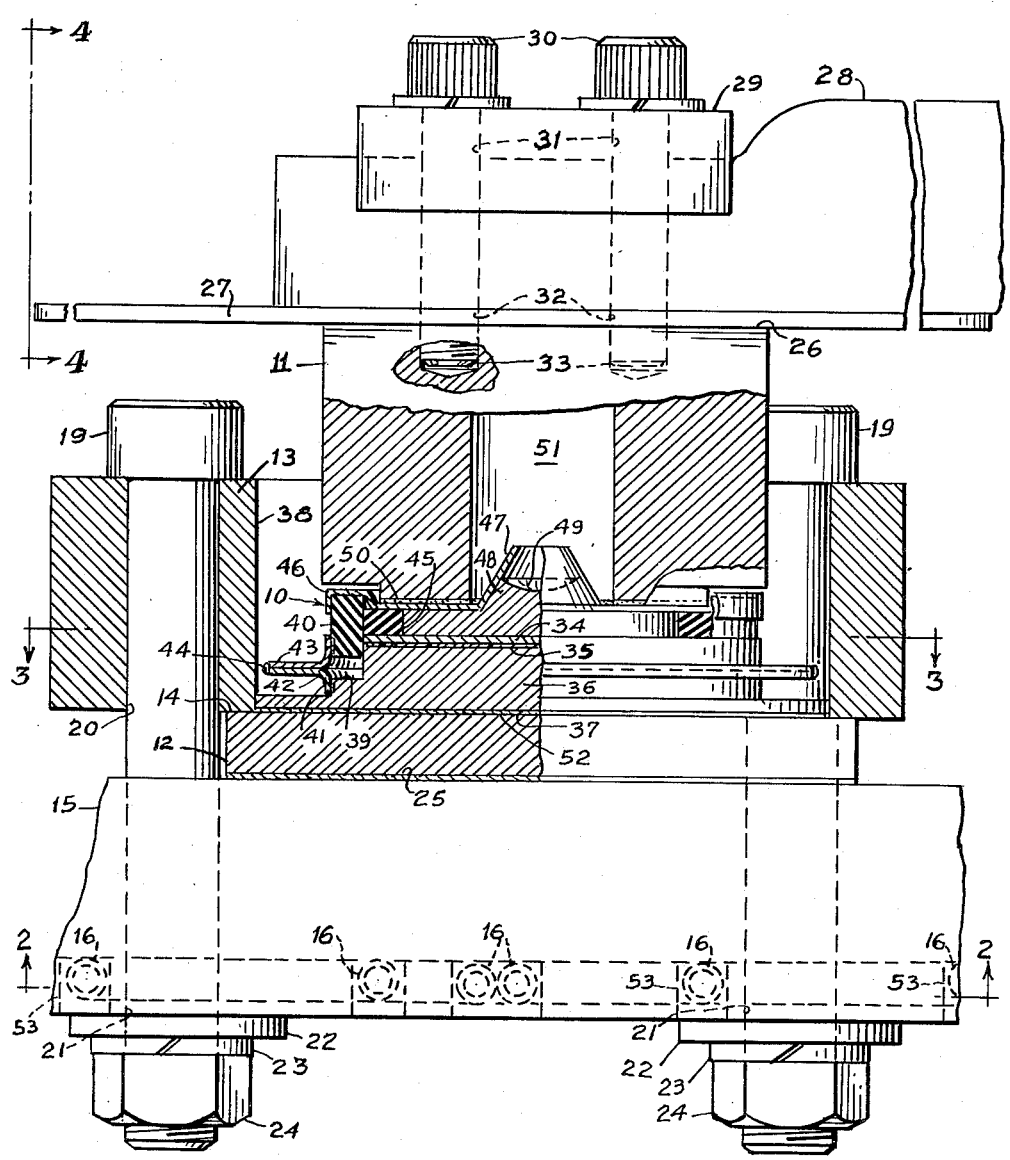
FIG. 1 is a side elevation, partly in cross-section, of a current rectifier and a mounting and cooling structure according to the invention.

Referring to the figures, a dry rectifier assembly 10 is attached to a conductive anode block 11 (sometimes called a "terminal block") which acts as an upper anode contact, forming one of the terminal means of the rectifier, and to a circular conductive base block 12 which acts as a lower cathode contact, forming the other terminal means of the rectifier. The anode block 11 and the base block 12 are preferably of copper, or some other metal of low resistance. A flange 13, preferably of steel, contacts the outer edge of the upper surface 14 of the base block 12.

A liquid cooled bus bar 15, preferably of copper, is disposed below the base block 12. The bus bar 15 is a structure which carries a conduit 16 having a plurality of turns for circulating coolant liquid. The conduit is held in slots 53 in the lower surface of the bus bar 15. The conduit 16 may be of any of various sizes and number of turns depending upon the current carried by the dry rectifier assembly 10 and the rate of flow of coolant liquid. An arrow 17 (see FIG. 2) represents coolant liquid entering the conduit 16 and an arrow 18 represents the coolant liquid discharging from the conduit 16. The bus bar 15 is provided so as to constitute one electrical terminal lead for the dry rectifier assembly 10. Four bolts 19 are passed through their respective pairs of holes 20 and 21 in flange 13 and the bus bar 15, respectively. Washers 22, lock washers 23 and nuts 24 enable the flange 13 and the bus bar 15 to be drawn toward one another to a tightened condition. The base block 12 is thus clamped between the flange 13 and the bus bar 15. A heat-conductive and electrically-conductive grease 25 for example silicone grease, is provided between the base block 12 and the liquid cooled bus bar 15. The silicone grease under pressure fills voids which may exist between opposing surfaces which are not perfectly smooth. Heat transfer from the base block 12 to the bus bar 15 is thereby improved by virtue of the direct contact of the grease with portions of opposing surfaces which may not otherwise make a direct contact. The tightening down of flange 13 by means of the bolts 19 puts the grease under high pressure.

Figure 2:
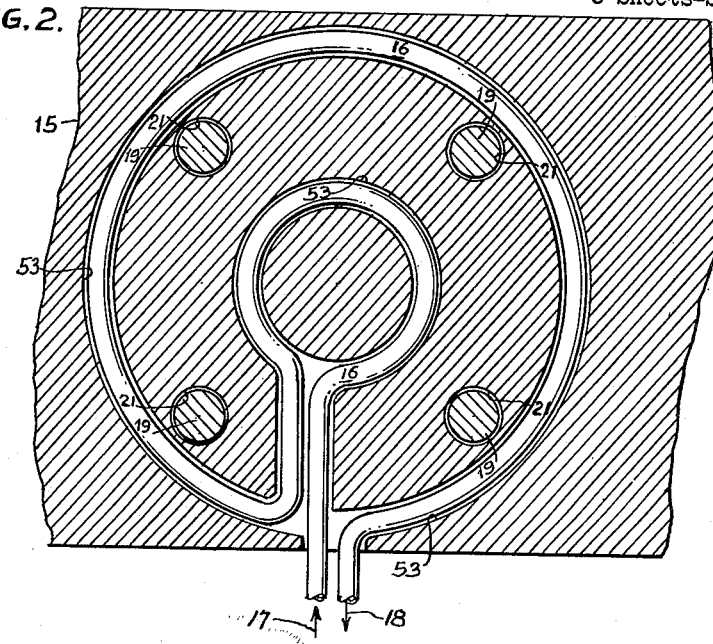
FIG. 2 is a cross-section taken at line 2—2 of FIG. 1.

It is to be understood that the bus bar 15 of FIGS. 1 and 2 should preferably be silver plated on its surface in contact with the base block 12 so as to further provide better electrical contact.

The anode block 11 has a flat thin metal cooling fin 27 soldered on its upper surface 26, which covers an area substantially larger than the anode block 11. A stack of these fins may be provided if desired. The size and number of cooling fins 13 is determined by the amount of heat to be dissipated by radiation. For a 500 ampere germanium rectifier element, for example, one fin, 6 inches by 6 inches has been found to be a desirable additional means for dissipating heat.

Figure 4:
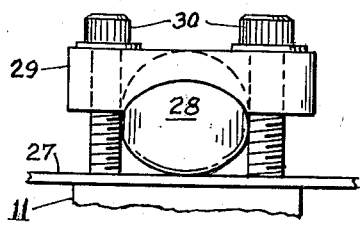
FIG. 4 is a fragmentary cross-section taken at line 4—4 of FIG. 1.
Figure 3:
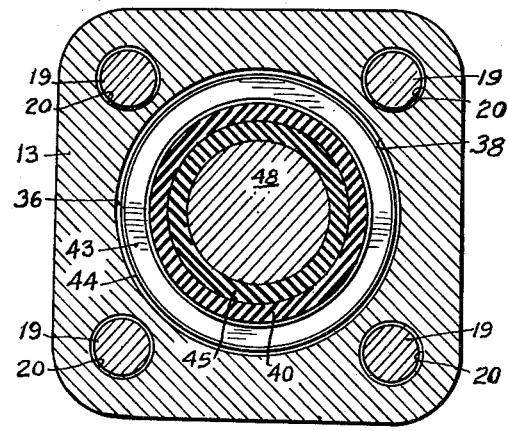
FIG. 3 is a cross-section taken at line 3—3 of FIG. 1.

A flexible conductive lead cable 28 constituting another terminal lead from the rectifier is bolted against the cooling fin 27. As best shown in FIG. 4, a yoke 29, fits over the top of the cable 28. Two bolts 30 are provided on each side of the cable 28. The bolts 30 pass through holes 31 and 32 in the yoke 29 and the cooling fin 27, respectively, and engage in tapped holes 33 in the upper part of the anode block 11. The yoke 29 and the bolts 30 maintain the lead 28, the cooling fin 27 and the anode block 11 in electrical contact.

The dry rectifier assembly 10 shown in FIG. 1 comprises a rectifying material 34, which may be a slice or wafer of germanium or silicon crystal, for example, which is attached to a base plate 36 by a layer of conductive solder 35. The base plate, constituting one of the terminal contacts of the rectifier, is circular and has a bottom 37 which fits within the inner diameter 38 of flange 13. A shoulder 39 on base plate 36 receives an insulation ring 40, preferably of ceramic. The ring 40 surrounds the germanium wafer so that its inner diameter is against the rectifying material 34 and its outer diameter is of the same magnitude as the base plate diameter 41 below the shoulder 39. Two connector rings 42 and 43, preferably of nickel-iron surround portions of the ceramic ring 40 and the base plate 36. The ring 43 is soldered to the ceramic ring 40 which is metalized at areas of contact with the ring 43. The ring 42 is soldered to the base plate at the diameter 41. The rings 42 and 43 each have flanges 44 which are welded to one another at their periphery.

A glass ring 45 is provided on the outer region of the upper surface of the rectifying material 34, and a top-plate 46, constituting another terminal contact of the rectifier extends over the ceramic ring 40 and the glass ring 45. Within the internal diameter of the glass ring and below the top plate, the wafer and top plate are in contact with a filling 48 of an activating material, preferably of indium. The expression "filling of activating material" as used herein means a sufficient quantity of the activating material to bridge the space between wafer 34 and top plate 46, and does not necessarily require a complete occupation of all of the space therebetween. The top plate 46 has a conoidal member 47 above the filling 48, which conoidal member is also in contact with the filling 48. The uppermost surface 49 of the filling is below the upper limits of the conoidal member 47. The top plate 46 is soldered to the ceramic ring 40, which ring is metalized at areas of contact with the top plate. The anode block is soldered at 50 to the upper surface of the top plate 46. The anode block 11 has a large central hole 51 in its center into which the conoidal member 47 extends. The base plate 36 is soldered at 52 to the uppermost surface of the base block 12. The peripheral configuration of the dry rectifier assembly 10 is of a suitable shape so that its various parts can be securely held in a surrounding resin, if such a construction is desired. No resin however is used in the particular embodiment shown.

FIG. 5 is the same rectifier assembly unit as is shown in FIG. 1, the unit being numbered 54 in FIG. 5. It comprises the rectifier assembly 10 and 11 other structure of FIG. 1. A difference in the arrangement shown in FIGS. 5 and 6 resides in the fact that the bus bar 15 and conduit 16 of FIG. 1 is substituted in FIGS. 5 and 6 by modified form of bus bar 15' and conduits 16'.

In FIGS. 5 and 6, the fluid cooled bus bar 15', also preferably of copper, is disposed below the base block 12 and contains on its lower side a plurality of coolant conduits 16' held in individual slots 53' by a suitable resin 55. The size, number and placement of the conduits 16' depends upon the total rate of heat dissipation required for the member of rectifiers such as 10, 10' and 10" provided used, and the load carried by them. The bus bar 15' constitutes one electrical terminal for each rectifier assembly and therefore the bus bar face 56 against the base block 12 is preferably ground smooth and preferably silver plated for better electrical contact. The four bolts 19 are passed through flange holes 20 and bus bar holes 21', and then extend into tapped holes 57' in a plate 58 to which the bus bar is attached. Lock washers 23' are provided between the heads of the bolts 19 and the flange 13. The four bolts 19, when they are turned into respective tapped holes 57' in the plate 58, enable the flange 13 and the bus bar 15 to be drawn toward one another to a tightened condition, in much the same manner as in the embodiment of FIGS. 1 to 4.

The preferred embodiment of a bus bar for use with the invention is that of FIGS. 5 and 6, although it is to be understood that either of the embodiments shown and described work in a substantially similar manner since the principle of operation of the two embodiments is the same.

To operate the devices of this invention, water or other cooling fluid is circulated through the conduits 16 in the bus bar 15 (referring to FIG. 1). Alternating current is provided by means of the electrical path through the rectifier having electrical terminals comprising the connected bus bar 15 and the flexible lead 28. The current generates heat in large concentration at the rectifying material. Some of this heat goes to the anode block and the base block by conduction. From the anode block 11, the heat is transferred either to surrounding air or to the radiating fin 27 and then to the surrounding air.

From the base block 12, the heat is transferred partly by conduction through the silicone grease 25, which is under high pressure and in contact with the base block 12, and partly by conduction due to direct contact of the base block 12 and the bus bar 15.

Heat is thereby transferred to the liquid cooled bus bar 15 with which the silicon grease 25 is also in contact. The heat is then carried away by the circulating coolant in the conduit 16 of the bus bar.

It will be recognized that the arrangement of FIGS. 5 and 6 operates in a manner similar to that of FIGS. 1 to 4; it being understood that the cooling fluid is passed through conduits 16' of bus bar 15'.

It will be understood that the terms "cathode" and "anode" have been used herein for convenience in describing the structure, but that the structure is not to be limited by the orientation of cathode and anode as set up by the wafer of conductive material and its associated activating material.

The bolts 19 and their associated nuts 24 in FIG. 1, and bolts 19 and tapped holes 57' in FIG. 5 are referred to as "bolt means." This term implies elongated members interconnecting the flange member and bus bar so as to draw them together, and is not limited to any particular type of fastener assembly for this purpose.

The rectifier housing of this invention provides a means of maintaining good heat-conductive and good electrically-conductive contact from a bus bar to a rectifier assembly without undue stresses in structures of the rectifier element itself. The steel flange 13 with its attachment bolts 19 provides the large compression stresses needed to maintain the above-desired contact. No stresses are present in the copper members other than compressive stress upon the base block 12.

There is no liquid coolant in the portion of the structure housing the rectifier assembly itself and this arrangement permits replacing of the rectifying material junction without stoppage of the flow of the liquid coolant and without any spilling of the coolant.

This device needs only an inlet and an outlet connection for circulating liquid coolant. This makes for simpler and easier installation and repair particularly in view of the separability of the rectifier units and the coolant means.

I do not desire that this invention be limited to the specific embodiments shown and described but only in accordance with the scope of the appended claims, since persons skilled in the art may devise other forms that are still within the limitations of said claims.

I claim:

1. Means for mounting a current rectifier having a pair of terminal contacts to a structure, comprising an electrical terminal means in electrically conductive communication with one of said terminal contacts of said current rectifier; a second electrical terminal means in electrically conductive communication with the other of said terminal contacts of said current rectifier; a flange, said flange overlapping at least part of said second electrical terminal means; so as to bear against said second electrical terminal means; means for attaching said flange to said structure; and electrically-conductive grease disposed between said second electrical terminal means and said structure; whereby said flange by said means for attaching may be brought to bear against said overlapped portion of the second electrical terminal means, thereby pressing said second electrical terminal means against said structure in such a manner as to provide compression on said grease and provide substantially uniform electrically conductive and heat conductive communication between said second electrical terminal means and said structure.

2. Apparatus according to claim 1 in which said electrically conductive grease is a silicone grease.

3. Means for mounting a current rectifier having a pair of terminal contacts to a structure comprising: a first block in electrically-conductive communication with one of said terminal contacts of said current rectifier; a second block in electrically-conductive and heat-conductive communication with the other of said terminal contacts of said current rectifier, said blocks being on opposite sides of the rectifier; a flange, said flange overlapping at least part of said second block so as to bear against the periphery of said second block; attachment means for attaching said flange to said structure; an electrically-conductive and heat-conductive grease disposed between said second block and said structure; whereby said flange is adapted to be brought to bear against said second block by said attachment means, thereby pressing said second block against said structure in such a manner as to provide compression on said grease and provide substantially uniform electrically-conductive and heat conductive communication between opposing areas of said second block and said structure.

4. Apparatus according to claim 3 in which said structure on which said rectifier mounting means is mounted comprises a bus bar.

5. Apparatus according to claim 4 in which said bus bar comprises a conductive structure having cooling conduits extending therethrough, said cooling conduits being adapted to circulate a coolant fluid for cooling said second block.

6. Apparatus according to claim 3 in which said flange is made of steel.

7. Means for mounting a current rectifier having a pair of terminal contacts to a bus bar comprising: an electrical terminal lead; a cooling fin; a first block in heat-conductive communication with said cooling fin, and in electrically-conductive communication with said terminal lead, said first block being also in electrically-conductive and heat-conductive communication with one terminal contact of said current rectifier; a second block in electrically-conductive and heat-conductive communication with the other terminal contact of said current rectifier; a flange, said flange overlapping at least part of said second block, so as to bear against said second block; attachment means for attaching said flange to said bus bar; an electrically-conductive and heat-conductive grease disposed between said cathode block and said bus bar; whereby said flange is adopted to be brought to bear against said second block by said attachment means, thereby pressing said second block against said bus bar in such a manner as to provide compression on said grease and provide substantially uniform electrically-conductive and heat-conductive contact between said second block and said bus bar.

8. Apparatus according to claim 7 in which said cooling fin comprises a metal plate in heat-conductive contact with said first block, said cooling fin thereby radiating heat transferred thereto from said anode block, whereby said anode block is cooled by the fin.

9. In combination: a current rectifier comprising a wafer of rectifying material, which wafer has two opposite surfaces; a base block and a base plate, said base plate being conductively mounted to said base block and to a first one of said surfaces; a top plate; a filling of activating material extending between the second one of said surfaces and the top plate thereby connecting said top plate to the wafer, the base block and top plate each providing a terminal for the rectifier; an insulating ring surrounding said filling and extending between the second surface and the top plate; and means for mounting said current rectifier to a supporting structure and connecting it into a circuit comprising a terminal block conductively mounted to the top plate, a flange member having a central hole therethrough, the flange member extending around the periphery of the current rectifier and overlapping a part of said base block, said flange member having a plurality of holes therethrough, and said structure having holes aligned therewith, bolt means received in said aligned holes for drawing the flange toward the structure, thereby compressing the base block between the flange member and the structure.

10. In combination: a current rectifier comprising a wafer of rectifying material, which wafer has two opposite surfaces, a base block and a base plate, said base plate being conductively mounted to said base block and to a first one of said surfaces; a top plate; a filling of activating material extending between the second one of said surfaces and the top plate thereby connecting said top plate to the wafer; and inner and an outer insulating ring, said inner ring extending between the top plate and the second surface and surrounding the filling, said outer ring surrounding and contacting the inner ring, the wafer, and part of the base plate, and said outer ring being engaged by the top plate, a first connector ring attached to the outer insulating ring, a second connector ring attached to the base plate, said connector rings being attached to each other; a bus bar, slots in said bus bar, and cooling conduits in said slots adapted to circulate coolant fluid for cooling the bus bar; and means for mounting said rectifier to said bus bar and connecting into a circuit comprising a terminal block mounted to said top plate, a cooling fin connected to said terminal block, a yoke adapted to attach a terminal lead to said terminal block, a flange member having a hole therethrough, the flange member extending around the periphery of the current rectifier and overlapping a part of said base block, said flange member and said bus bar having aligned holes, bolt means received in said holes for drawing the flange toward the structure, thereby compressing the base block between the flange member and the bus bar; and a layer of electrically-conductive and heat-conductive grease disposed between the bus bar and the base block, tightening down of the bolt means serving to compress said grease, whereby the grease provides a substantially uniform electrically-conductive and heat-conductive contact between the base block and the bus bar.

11. Apparatus according to claim 10 in which the terminal block has a central hole therein, and in which the top plate has a central portion extending into said hole, the said central portion having an opening therethrough.

12. Means for mounting a current rectifier having a pair of terminal contacts to a structure, comprising an electrical terminal means in electrically conductive communication with one of said terminal contacts of said current rectifier; a second electrical terminal means in electrically conductive communication with the other of said terminal contacts of said current rectifier; a flange, said flange overlapping at least part of said second electrical terminal means so as to bear in removable abutting relation against said second electrical terminal means; means for attaching said flange to said structure; whereby said flange by said means for attaching may be brought to bear against said overlapped portion of the second electrical terminal means, thereby pressing said second electrical terminal means against said structure and providing substantially uniform electrically conductive and heat conductive communication between said second electrical terminal means and said structure, said flange being removable from said overlapped portion when said attaching means are removed.

References Cited in the file of this patent

UNITED STATES PATENTS

| | | |
|---|---|---|
| 2,780,759 | Boyer et al. | Feb. 5, 1957 |
| 2,783,418 | Peter et al. | Feb. 26, 1957 |
| 2,806,187 | Boyer et al. | Sept. 10, 1957 |
| 2,820,930 | Coy et al. | Jan. 21, 1958 |
| 2,838,722 | Watson | June 10, 1958 |
| 2,866,928 | Blundell | Dec. 30, 1958 |